(12) United States Patent
Schubert

(10) Patent No.: US 6,326,099 B1
(45) Date of Patent: Dec. 4, 2001

(54) IMPACT MODIFIED POLYSTYRENE GASKETS FOR ELECTROCHEMICAL CELLS

(75) Inventor: Mark A. Schubert, Brooklyn, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/357,589

(22) Filed: Jul. 20, 1999

Related U.S. Application Data

(63) Continuation-in-part of application No. 09/222,144, filed on Dec. 29, 1998.

(51) Int. Cl.[7] ....................................... H01M 2/12
(52) U.S. Cl. .................... 429/54; 429/53; 429/35
(58) Field of Search ................................ 429/54, 53, 57, 429/59, 60, 163, 164, 180, 181, 185, 174, 71, 34, 35, 36; 525/165, 185

(56) References Cited

U.S. PATENT DOCUMENTS

| 4,343,869 | 8/1982 | Oltman et al. . |
| 4,404,266 | 9/1983 | Smilanich ............................. 429/27 |
| 5,395,890 | 3/1995 | Nakano et al. . |
| 5,908,898 | * 6/1999 | Wan-Cheng et al. ................. 525/185 |

FOREIGN PATENT DOCUMENTS

| 874408 | * 4/1998 | (EP) | ............................. H01M/2/02 |
| 6-203814 | * 7/1994 | (JP) | ............................. H01M/2/02 |
| 7-53815 | * 2/1995 | (JP) | ............................. C08L/25/00 |
| 9-180689 | * 7/1997 | (JP) | ............................. H01M/2/02 |
| 10-100224 | * 4/1998 | (JP) | ............................. B29C/47/40 |
| WO 94/22175A | 9/1994 | (WO) . | |

* cited by examiner

Primary Examiner—Gabrielle Brouillette
Assistant Examiner—R Alejandro
(74) Attorney, Agent, or Firm—Stewart A. Fraser

(57) ABSTRACT

A gasket for an electrochemical cell is formed of a styrenic polymer blend including a styrenic polymer and an impact modifying agent which increases the toughness of the styrenic polymer. The styrenic polymer based gasket has several advantages over conventional nylon gaskets, including better processability, and improved chemical resistance to alkaline medium.

15 Claims, 3 Drawing Sheets

IMPACT MODIFIED POLYSTYRENE GASKETS FOR ELECTROCHEMICAL CELLS

CROSS-REFERENCE TO RELATED APPLICATION

This application is a continuation in part of U.S. patent application Ser. No. 09/222,144, filed Dec. 29, 1998, entitled "IMPACT MODIFIED POLYSTYRENE SEALS FOR GALVANIC CELLS".

FIELD OF THE INVENTION

This invention relates to improved gaskets for electrochemical cells, more particularly to non-ventable gaskets for electrochemical cells.

BACKGROUND OF THE INVENTION

Electrochemical cells, such as miniature alkaline air cells, are stable, high-energy sources for electrical devices such as hearing aids. An alkaline electrolyte must be sealed within the confines of a miniature alkaline air cell to prevent corrosive damage to the exterior of the cell and possibly to the electrical device in which it is housed, while a continuous supply of air must be provided to the surface of the air electrode.

Generally, a miniature alkaline air cell comprises an outer metal container having at least one air opening in its base to provide air to the active air electrode, a hydrophobic film layer, an air electrode, a separator layer, an anode mask, and an electrolyte. The cell assembly is capped with a gasket and metal cell cover which seals the open end of the cell container thereby sealing in the alkaline electrolyte. The term "gasket" as used herein refers to a non-ventable sealing member for providing a fluid-tight joint between battery components. Gaskets for alkaline air cells have generally been made from nylon, polypropylene or polysulphone, with nylon being preferred, especially nylon 66. However, nylon gaskets for miniature alkaline air cells have major disadvantages. First, nylon absorbs moisture making it susceptible to hydrolytic degradation in a corrosive electrolyte. As a result of the tendency for nylon to absorb moisture, it must be dried prior to molding. After molding, the dimensions and properties of the resulting nylon gasket are affected by the tendency of nylon to absorb moisture. Hydrolytic degradation of nylon occurs through chain scission of amide bonds. Chain scission embrittles the nylon gasket making it susceptible to stress cracking, which leads to gasket failure and leakage of electrolyte from the cell.

SUMMARY OF THE INVENTION

The inventor has discovered that an electrochemical cell having a gasket formed of a styrenic polymer blend is less sensitive to moisture and hydrolytic degradation. As a result, the use of a gasket which is formed of a styrenic polymer blend provides an electrochemical cell which is substantially less likely to exhibit electrolyte leakage on account of gasket failure.

DESCRIPTION OF THE PREFERRED EMBODIMENTS

While the illustrated embodiment of the invention is a miniature air cell, the invention may be applied to electrochemical cells generally, including alkaline cells such as AA, AAA, AAAA, C and D cells.

Figure 1:
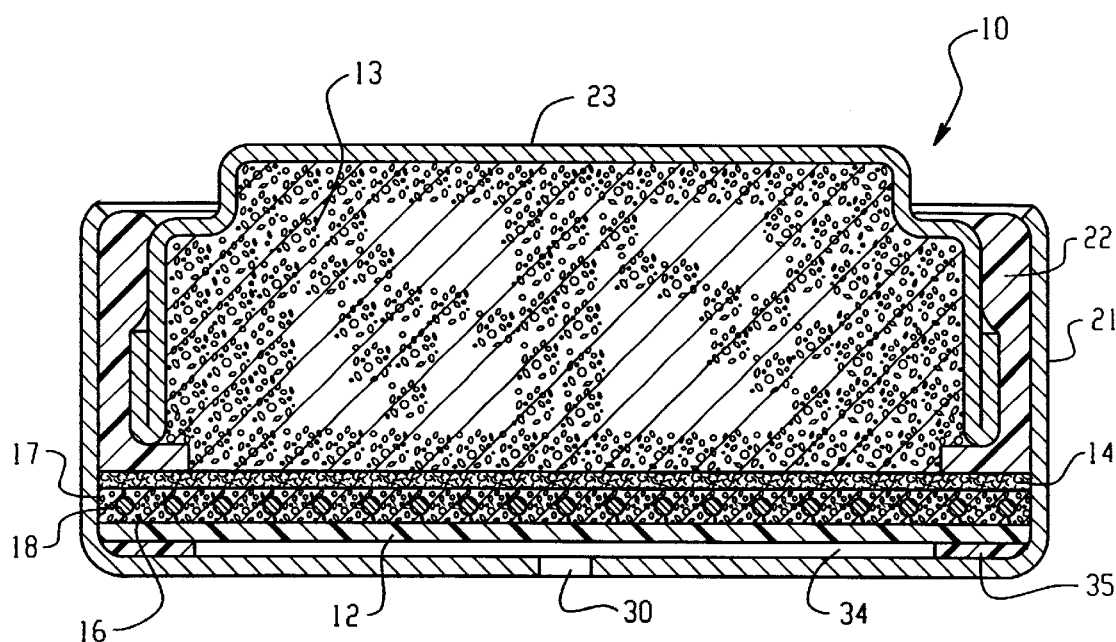
FIG. 1 is a sectional side elevation view taken through an assembled miniature alkaline air cell.
Figure 2:
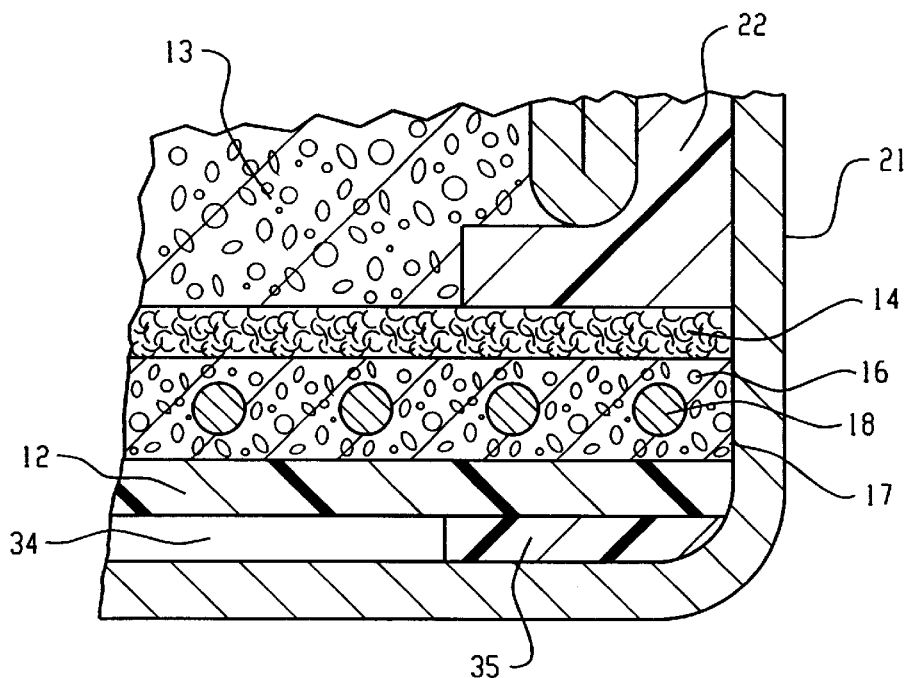
FIG. 2 is a partial cross-sectional side view of the assembly of FIG. 1.

Referring to FIGS. 1 and 2, there is shown a sectional side elevation of a miniature alkaline air cell 10. The internal cell components comprise an air electrode 17, which is a laminated electrode that has a first layer 16 which may comprise a mixture of active materials such as activated carbon and binder, a second layer 18 which is a current collector, and a third layer 12 which is a hydrophobic membrane. The internal components also comprise an anode material 13, and a separator layer 14 between the air electrode and the anode material. Separator layer 14 permits passage of electrolyte ions but prevents migration of ions in the air electrode to the anode material. The internal cell components 10, 12, 13, 14, 16, 17 and 18 are housed in container 21 which is in intimate electrical contact with the current collector 18 and sealed at its open end by an electrically insulating gasket 22 and cell cover 23 which is in electrical contact with anode material 13. Gasket 22 is radially squeezed between cell container 21 and cover 23 so as to form a primary barrier to electrolyte leakage. The base of container 21 includes at least one air opening 30 which provides ingress and egress of air within air diffusion chamber 34 to air electrode 17. The container base may be separated from the air electrode by a thin resiliently deformable ring 35.

Gasket 22 may be formed, such as by injection molding, and inserted between container 21 and cell cover 23 during assembly of cell 10. Alternatively, gasket 22 can be formed by insert molding gasket 22 onto container 21 or onto cover 23.

Gasket 22 is made from, or comprised of, an impact modified polystyrene material.

Preferred modified polystyrene materials may be comprised of a styrenic polymer blended with an impact modifier which reduces the brittleness of the styrene and increases its toughness. Examples of suitable styrenic polymers include general purpose polystyrene (GPPS) and syndiotactic polystyrene (SPS). General purpose polystyrene is an amorphous, widely used commodity polymer which is extremely brittle at galvanic cell use temperature, due to its glass transition temperature of 100° C. Syndiotactic polystyrene, which is sold under the trade name Questra® by Dow Chemical Company, is a semi-crystalline thermoplastic a polymer. However, as opposed to the unordered atactic configuration of amorphous general purpose polystyrene, syndiotactic polystyrene is comprised of styrene monomer units arranged in a highly ordered alternating configuration along the polymer chain. This ordered structure allows the polymer chains to crystallize. The crystallinity improves the strength and heat resistance of the material near and above the glass transition temperature. Accordingly, on account of the improved heat resistance and strength properties, syndiotactic polystyrene is preferred. Other styrenic polymers which may be suitable for preparing the galvanic cell gaskets of the invention include styrenic copolymers and halogenated styrenic polymers.

Examples of suitable impact modifiers for reducing the brittleness and increasing the toughness of styrenic polymers include polyolefinic thermoplastic elastomers and tri-block copolymers with an elastomeric block between two rigid thermoplastic blocks. Examples of polyolefinic thermoplastic elastomers include those polymerized from ethylene, octane, and butylene monomer units which are copolymerized, such as in the presence of a metallocene catalyst, to produce saturated hydrocarbon rubbery materials. Preferred tri-block copolymer impact modifiers which may be used for preparing impact modified styrenic polymer blends from which galvanic cell gaskets may be prepared include those having thermoplastic blocks which are amorphous polystyrene. The amorphous polystyrene blocks provide improved miscibility in styrenic polymers such as SPS and GPPS as compared with polyolefinic elastomers. Preferred tri-block copolymer impact modifiers include styrene-butadiene-styrene (S-B-S), styrene-isoprene-styrene (S-I-S), styrene-ethylene/butylene-styrene (S-EB-S) and styrene-ethylene/propylene-styrene (S-EP-S) block copolymers. S-EB-S and S-EP-S copolymers are more preferred because they do not contain any sites of unsaturation, and are therefore less susceptible to oxidative degradation.

Another suitable impact modified styrenic polymer which can be used in the practice of this invention is high impact polystyrene (HIPS). High impact polystyrene is produced by dissolving polybutadiene rubber in styrene monomer. As styrene polymerizes it forms a continuous phase around discrete polybutadiene phases with occlusions of polystyrene. The styrene monomer is polymerized with traditional catalysts and is therefore in the atactic amorphous phase. Some of the rubber is chemically grafted to the polystyrene phase. Therefore, HIPS has excellent toughness through the intimate incorporation of the polybutadiene rubber.

Another preferred impact modified styrenic polymer is super high impact polystyrene, sold by Dow Chemical Company under the trade name AIM®. AIM® is a HIPS-like product with improved incorporation of the rubbery phase. Hence, AIM® is a very tough material and is an excellent material for preparing the gaskets of this invention. AIM® differs from impact modified general purpose polystyrene, impact modified syndiotactic polystyrene and conventional high impact polystyrene in that it exhibits improved plastic deformation characteristics. Specifically, AIM® can undergo a yield and ductile deformation similar to nylon. This allows the material to experience higher strains than impact modified general purpose polystyrene, impact modified syndiotactic polystyrene and conventional high impact polystyrene before cracking of the gasket and leakage of the galvanic cells can occur.

The impact modified styrenic polymer blend used to prepare the galvanic cell gaskets preferably contain the minimum amount of impact modifier which is necessary to allow the gasket to be installed into the galvanic cell without cracking or breaking when a nail 36 is installed through the gasket and when the steel can is crimped to gasket the cell. Unmodified styrenic materials such as general purpose polystyrene and syndiotactic polystyrene would be ideal materials for gaskets for galvanic cells containing an alkaline electrolyte because of their relatively low cost, good processing characteristics, moisture independent physical characteristics, and resistance to alkaline media. However, unmodified styrenic materials are excessively brittle and must be blended with an impact modifier before being molded into a battery gasket. In the case of polyolefinic elastomer impact modifiers, suitable blends comprise from 60 to 95% by weight styrenic polymer and from 5 to 40% by weight of polyolefinic elastomer based on the total weight of styrenic polymer and polyolefinic elastomer impact modifier, with blends comprising from about 70 to about 95% by weight styrenic polymer and about 5 to about 30% by weight polyolefinic elastomer being preferred. In the case of tri-block copolymer impact modifiers, the impact modified styrenic polymer blends may contain from about 50 to about 95% by weight styrenic polymer and from about 5 to about 50% by weight tri-block copolymer impact modifier based on the total weight of styrenic polymer and impact modifier, and more preferably from about 70 to about 95% styrenic polymer by weight and from about 5 to about 30% tri-block copolymer by weight. In the case of high impact polystyrene and super high impact polystyrene, the styrenic polymer phase may comprise from about 60% to about 95%, and the rubbery phase may comprise from about 5% to about 40% by weight, based on the total weight of the styrenic phase and the rubbery phase.

The inventor has discovered that while gaskets prepared from the impact modified styrenic polymers described above exhibit several outstanding performance characteristics as compared with conventional nylon battery gaskets, the styrenic polymer gaskets can sometimes exhibit unacceptable leakage, especially at higher temperatures. This problem is due to the relatively high rate of stress relaxation of the styrenic polymer blends. This problem can be overcome by changing the design of the gasket to counteract the effects of stress relaxation, e.g., such as by using a resilient or springy retainer or washer which acts on the gasket to compensate for stress relaxation. However, as another alternative which does not require design changes, the styrenic polymer blends can be modified by adding an anti-stress relaxation agent. For example, poly(phenylene oxide) (PPO) can be added to the styrenic polymer blend to reduce stress relaxation. An amount of anti-stress relaxation which is effective to achieve a desired reduction in stress relaxation can be easily determined by those having ordinary skill in the art by conducting routine experiments. An example of a commercially available styrenic polymer blend exhibiting reduced stress relaxation is available from GE Plastics under the trade name NORYL®. The NORYL® products are a blend of HIPS and PPO. NORYL® EM6101 exhibits a suitable combination of properties for use as a battery gasket material and will lower the overall cost of alkaline cells while allowing for even lower profile gaskets than nylon. Based on standardized bench top tests, NORYL® blends have better thermal, creep and stress relaxation resistance than nylon and other conventional materials. Adding PPO to styrenic gasket materials does not decrease their chemical stability in the in-cell environment.

Other types of anti-stress relaxing agents include inorganic fillers such as talc, calcium carbonate, carbon black, silica and the like.

Various tests were conducted which demonstrate that the impact modified styrenic polymeric materials have certain performance characteristics, which provide improved galvanic cell gasket performance.

Potassium Hydroxide Compatibility Test

Potassium hydroxide compatibility tests were conducted on impact modified styrenic polymer compositions and compared with similar compatibility tests on nylon. The tests were conducted at high temperatures to accelerate degradation. The materials were not under stress. However, it is not expected that stress would dramatically influence the comparison.

Potassium hydroxide resistance for nylon and unmodified general polystyrene were compared by floating nylon and general purpose polystyrene tensile bars (⅛ inch thick) on a 37% potassium hydroxide solution in a fluoropolymer vial placed in an oven at 130° C. for 35 days. The bars were periodically removed, weighed and replaced into the solution. The results (shown in FIG. 2) indicate that the unmodified general purpose polystyrene tensile bar did not have an appreciable weight loss after 35 days, whereas the nylon 66 tensile bar had approximately a 14% weight loss after 35 days of exposure to the 37% potassium hydroxide solution at 130° C.

Microtensile bars (1/32 inch thick) with a 0.009 inch thick section were molded from nylon (Zytel 101F), unmodified general purpose polystyrene, unmodified syndiotactic polystyrene, and impact modified syndiotactic polystyrene. Each of the microtensile bars were submerged in 37% potassium hydroxide solution in a sealed fluoropolymer bottle and placed in an oven at 95° C. for 39 days. The bars were periodically removed, weighed and replaced into the solution. The results (shown in FIG. 3) demonstrate that none of the styrenic polymer materials had any appreciable weight loss during the testing period, whereas the nylon microtensile bar had approximately a 4.5% weight loss after 39 days of exposure to the 37% potassium hydroxide solution at 95° C. The results shown in FIGS. 2 and 3 strongly suggest that the styrenic polymer based materials, whether modified or unmodified, are more resistant to degradation when exposed to potassium hydroxide than nylon.

Figure 4:
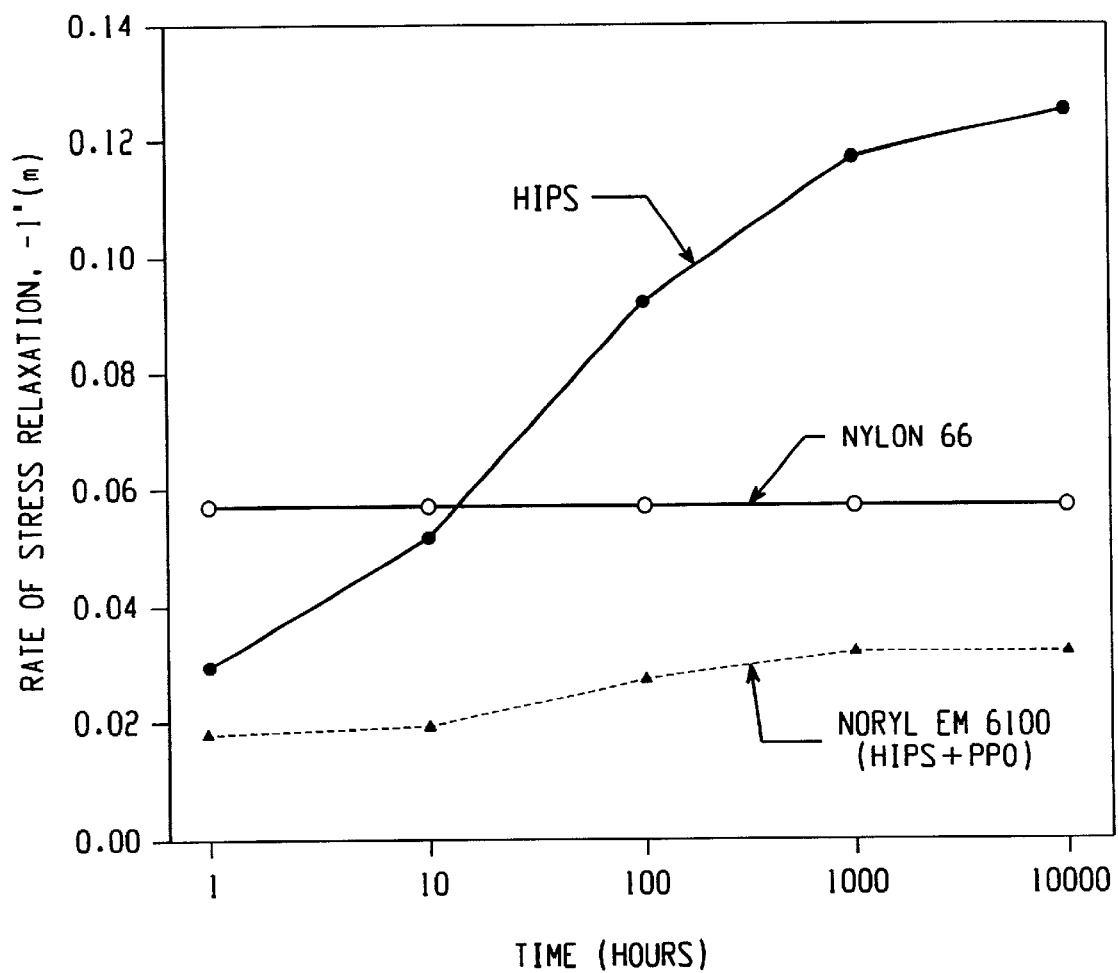
FIG. 4 is a graph of rate of stress relaxation verses time for NORYL® EM6100, HIPS and ZYTEL® 101F.

To verify that the styrenic materials are not degrading when exposed to potassium hydroxide, attenuated total reflectance-fourier transform infrared (ATR-FTIR) spectroscopy was used to evaluate any chemical changes at the surface of the specimens. FIG. 4 shows that the locations of the absorbent peaks and the relative heights of the peaks are about the same for general purpose polystyrene samples which have been untreated, and for those which have been exposed to a 37% potassium hydroxide solution at 130° C. for 39 days. Similar results were found for unmodified syndiotactic polystyrene, impact modified general purpose polystyrene, and impact modified syndiotactic polystyrene. The results confirm that no a significant potassium hydroxide degradation has occurred on the surfaces of the styrenic polymer materials. In contrast, FIG. 5 shows many changes in the ATR-FTIR spectrograph of untreated nylon as compared with nylon which has been exposed to a 37% potassium hydroxide solution at 130° C. for 39 days. The changes in the spectrographs for the nylon samples are due to new peaks associated with degradation products of nylon. Two large changes are present at the 3,000–3,500 $cm^{-1}$ region where primary amine groups absorb, and at the 1500–1600 $cm^{-1}$ where carboxylic acid salts absorb. The amine peaks wash out the 3,100 $cm^{-1}$ peak and the carboxylic acid group is seen as a definite shoulder on the 1550 $cm^{-1}$ peak. The presence of the amine end groups is consistant with the anticipated degradation products based on the hydrolysis mechanism of nylon in water.

Gel permeation chromatography (GPC) was used to further characterize changes on the samples exposed to potassium hydroxide solutions. To concentrate on the exposed area of the samples, shavings taken from the surface were used to measure molecular weight. The results of the GPC analysis are shown in Table 1. The potassium hydroxide treatments decreased the nylon (Zytel) molecular weight by a factor of 25, and in the worst case, decreased the polystyrene molecular weight by, at most, 15%. However, that particular condition was a 130° C. test where the sample was floated on the surface of a 37% potassium hydroxide solution, and hence exposed to air. At 130° C. for 39 days, it is possible that the polystyrene may experience some thermal oxidative degradation. Even so, it has a small influence on molecular weight. The results demonstrate that the styrenic polymer based materials are much more stable in potassium hydroxide than nylon. The results suggest that nylon weight loss is due to the production of very low molecular weight degradation products which can dissolve into the aqueous environment, whereas the changes in molecular weight for the styrenic polymer samples were relatively modest in comparison.

TABLE 1

Weight Average Molecular Weight (Mw in Daltons), Mean ± S.D., n = 2

| | GPPS | GPPS | GPPS-Impact Modified | Zytel 101F 80% regrind |
|---|---|---|---|---|
| Control (untreated) | 318,000 ± 83 | 303,200 ± 2500 | 316,800 ± 2500 | 65,700 ± 4200 |
| Treated in 37% KOH @ 95° C. for 35 days | 312,200 ± 1600 | 320,200 ± 200 | 2500 (n = 1) | |
| Treated in 37% KOH @ 130° C. for 39 days | 257,300 ± 30 | 2700 ±300 | | |

Glass Transition Temperature

The glass transition temperature of a plastic material is the temperature at which the amorphous phase of the material undergoes a transition from a glassy state to a flexible state involving motion of long segments in the polymer chain. Near and above the glass transition temperature, the material will undergo increased stress relaxation and creep. The glass transition temperature for various materials is shown in Table 2. The data indicates that the styrenic materials have two advantages when used as a gasket for galvanic cells having an alkaline electrolyte. First, because styrenes do not absorb water, the glass transition temperature does not depend upon moisture. Second, the glass transition temperature of the polystyrene matrix, which dominates the relaxation behavior, is higher than polypropylene and nylon 66 at any moisture level. High temperatures for battery end use can be as high as 85° C. Therefore, the styrenic polymer based materials are expected to undergo less stress relaxation and less creep than nylon 66.

TABLE 2

| Material | Glass Transition Temperature, ° C. |
|---|---|
| Nylon 66 - dry as molded | 80° C. |
| Nylon 66 - 2.5% $H_2O$ | 40° C. |
| Nylon 66 - 8.5% $H_2O$ | –15° C. |
| Talc Filled Polypropylene Homopolymer | 11° C. |
| Impact Modified SPS | 100° C. |
| Impact Modified GPS | 100° C. |
| HIPS | 100° C. |
| AIM | 100° C. |

Linear Thermal Expansion

Thermal cycling of batteries occurs during their lifetime. Accordingly, preferred gasket materials should undergo minimal thermal expansion, i.e., have lower co-efficiency of linear thermal expansion. The data shown in Table 3 indicates that, except for general purpose polystyrene, styrene materials have a co-efficient of linear thermal expansion which is as low or lower than nylon.

TABLE 3

| Material | Coefficient of liner thermal expansion × $10^{-5}$ (cm/cm/K) @ 25° C. |
|---|---|
| Nylon 66 | 8.1 |
| Talc Filled Polypropylene Homopolymer | 9.8 |
| Impact Modified SPS | 6.8 |
| Impact Modified GPPS | 9.0 |
| HIPS | 6.8 |
| AIM | 8.1 |

Deflection Temperature Under Load—ASTM D648

The heat resistance of a galvanic gasket is crucial to maintaining a gasket and preventing leakage of electrolyte. The deflection temperature under load (DTUL) is a normalized method of determining the temperature at which a material is deflected under a specified amount of load. A higher DTUL indicates that a material has better resistance properties. The data shown in Table 4 indicates that at the lowest stress, nylon 66 has the most heat resistance. However, at loads closer to those normally experienced by a gasket in a galvanic cell, AIM® with low molded-in stress and impact modified syndiotactic polystyrene show the most heat resistance. Nylon 66 has less heat resistance as it absorbs moisture. The styrenic based materials do not have this deficiency because they do not absorb water. From this analysis, styrenic based materials are expected to have better heat resistance properties, as they relate to gaskets for galvanic cells, than nylon and filled polypropylene.

TABLE 4

| Material | @ 66 psi (° C.) | @ 264 psi (° C.) |
|---|---|---|
| Nylon 66 - dry as molded | 210–243 | 65–90 |
| Talc Filled Polypropylene Homopolymer | — | 82 |
| Impact Modified SPS | 100 | 104 |
| Impact Modified GPPS | — | 78 |
| HIPS | — | 78–82 |
| AIM - low molded-in stress | 96 | 93 |
| AIM - high molded-in stress | 85 | 74 |

Surface Energy

Leakage of aqueous galvanic cells can occur when aqueous solution travels between the plastic and metal interface in the compressive sealing zone. A lower surface energy plastic will inhibit this migration compared to a high surface energy plastic. The data shown in Tables 5 and 6 indicates that styrenic polymer based materials have lower surface energy and higher water contact angles than nylon 66. Accordingly, gaskets made of the styrenic polymer based materials would be expected to have inherently better leakage performance than nylon gaskets.

TABLE 5

| Material | Critical Surface Tension of Wetting (dynes/cm) |
|---|---|
| Nylon 66 | 46 |
| Polystyrene | 33 |
| Impact Modifiers | near 30 |

TABLE 6

| Material | Water Contact Angle (°) |
|---|---|
| Nylon 66 | 45–50* |
| all styrene based materials | 90–100 |

*Decreases with increased moisture content of nylon material and with time in contact with surface.

Moisture Absorption

Absorption of moisture has three negative effects: (1) the material requires drying before molding, (2) the molded part will change dimensions as a function of moisture content and hence relative humidity, and (3) the properties of the molded part will change as a function of moisture content, and hence relative humidity. As shown in Table 7, the styrenic polymer based materials do not absorb an appreciable amount of water and therefore do not have these unwanted side effects.

TABLE 7

| Material | Equilibrium moisture (%) content in 50% RH | Equilibrium moisture (%) content in 100% RH |
|---|---|---|
| Nylon 66 | 2.5 | 8.5 |
| Polysulfone | — | 0.85 |
| Impact Modified SPS | <0.1 | <0.1 |
| Impact Modified GPPS | <0.1 | <0.1 |
| HIPS | <0.1 | <0.1 |
| AIM | <0.1 | <0.1 |

Injection Molding

As illustrated in Table 8, amorphous styrene tend to cool much quicker than polypropylene or nylon 66. The cooling times set forth in Table 14 are an indication of the amount of time after injection molding which is required for cooling and solidification of the molded part before it can be removed from the mold. Shorter cooling times result in shorter molding cycle times and higher production rates for a given molding apparatus.

TABLE 8

| | Cooling Time (seconds) | | |
|---|---|---|---|
| wall thickness (mm) | Amorphous Styrenes | Polypropylene | Nylon 66 |
| 0.5 | 1.0 | 1.8 | — |
| 1.0 | 2.9 | 4.5 | 3.8 |
| 1.5 | 5.7 | 8.0 | 7.0 |

Because the styrenic polymer based materials do not absorb appreciable amounts of moisture, drying of the styrenic polymer based materials is not required before molding. All nylons require strict control of the resin moisture between 0.10% and 0.25% by weight. Below 0.10% by weight solid state polymerization can occur in nylon, increasing the viscosity of the melt and making it difficult to fill the mold. Above 0.25% molded-in bubbles and flash occur.

Summary of Experimental Result

The data set forth above demonstrates that the impact modified styrenic polymer blends have highly advantageous properties for use in forming a gasket for a galvanic cell, especially gaskets for cells having an alkaline electrolyte. The data show that polyamides (such as nylon) are susceptible to chemical attack by the chemical environment of the battery. Polyamides also absorb moisture from the environment that change their dimensions and mechanical properties. Polypropylenes (mineral filled and unfilled) undergo extensive softening at temperatures experienced by the battery (e.g., 70–80° C.) which can cause leakage and unreliable performance. Polysulfone is costly, requires extremely high temperatures and low moisture levels to properly manufacture the gasket via injection molding.

Polystyrenes of various tacticities and levels of impact modification (through compounding with elastomers) are not susceptible to chemical attack by the chemistry of an alkaline galvanic cell, do not absorb appreciable moisture, do not soften until temperatures above which polypropylene (mineral filled and un-filled) will soften and are easily fabricated via injection molding, as they do not require drying and can be processed at much lower temperatures than polysulfone.

For use of a galvanic cell gasket, polystyrene requires toughening by blending with elastomeric polymers (impact modification agents). However, too much impact modification is not desirable, but will instead lead to softening of the polystyrene at high temperature (70–80° C.). Experimentation has shown that polyolefin or hydrogenated rubber/styrene are two types of elastomers that are acceptable for use in impact modification. However, any rubbery polymeric material may function in this application.

Atactic or syndiotactic polystyrene are acceptable for use in alkaline galvanic cells. Syndiotactic polystyrene form crystalline microstructure while the atactic polystyrene is amorphous. Both atactic and syndiotactic polystyrene have a glass transition temperature of 100° C. Near and above this temperature, syndiotactic polystyrene is preferred because the crystalline structure will maintain the mechanical strength of the materials while the atactic polystyrene will soften due to the absence of the crystallites, which do not melt until 270° C. Hence, in applications near or above 100° C. syndiotactic polystyrene is highly preferred.

Chemical Stability of NORYL®

One-eighth inch thick plaques of NORYL® EM6101 were molded. Sections of these were placed in 37% KOH or an EMD slurry with KOH at 71° C. for 16 weeks. These samples were then analyzed for chemical degradation by measuring their molecular weight via gel permeation chromatography (GPC). If any degradation was to occur, it would be concentrated at the surface where the NORYL® was in contact with the corrosive environment. Therefore, the upper 10 μm of the samples' surfaces were collected by slicing it off with a microtome. It was this 10 μm thick shaving that was dissolved for GPC analysis.

GPC analysis was performed.

Molecular weight statistics were calculated using the following definitions.

Number Average Molecular Weight, $Mn=\Sigma N_i M_i / \Sigma N_i$

Weight Average Molecular Weight, $Mn=\Sigma N_i M_i^2 / \Sigma N_i M_i$

Wherein $N_i$ is the number of polymer chains of molecular weight $M_i$

The number average molecular weight is simply the mean weight of all the polymer chains in the sample. The weight average molecular weight is the second moment of the distribution where the chains with higher weight count more toward its value. If the polymer chains in a sample are all equal in length then the number average and weight average are equal (the polydispersity (Mn/Mw) is unity).

Results and Discussion

Chemical Compatibility of NORYL

Table 9 shows the GPC results from accelerated aging of NORYL® EM6101. The data reveals that the molecular weight of the surface of NORYL® EM6101 does not change with treatment in the harsh KOH and EMD environments. As shown previously, HIPS is much more stable to these harsh environments than Zytel® 101F. Table 9 shows that adding PPO to HIPS does not decrease the stability of HIPS since no hydrolytic or oxidative chain scission occurred during the treatment of the NORYL.

TABLE 9

|  | CONTROL | 71° C. KOH | 71° C. $MnO_2$ |
|---|---|---|---|
| Mn | 8,000 | 9,000 | 8,000 |
| Mw | 36,000 | 35,000 | 32,000 |
| PDI 5000 | 22,000 | 19,000 | 18,000 |

Improved Thermal and Creep Properties

Table 10 shows the heat defection temperatures (HDT) of Zytel® 101F, and NORYL® EM6101. Heat deflection temperatures are obtained by placing a fixed load on a test specimen and the heat of the specimen is increased until the specimen softens enough to deflect a given distance. Therefore, HDT measures the creep of a material as temperature increases. The higher the HDT, the more resistance the material is to heat and creep. The data clearly show that NORYL® EM6101 is the most resistant material to heat and creep. The increased resistance is due to the PPO in the NORYL.

TABLE 10

| MATERIAL | HEAT DEFLECTION TEMPERATURE |
|---|---|
| Nylon 66-dry | 90 |
| HIPS | 78 |
| Impact Modified SPS | 80 |
| NORYL® EM6101 | 121 |

Improved Stress Relaxation Properties

Figure 3:
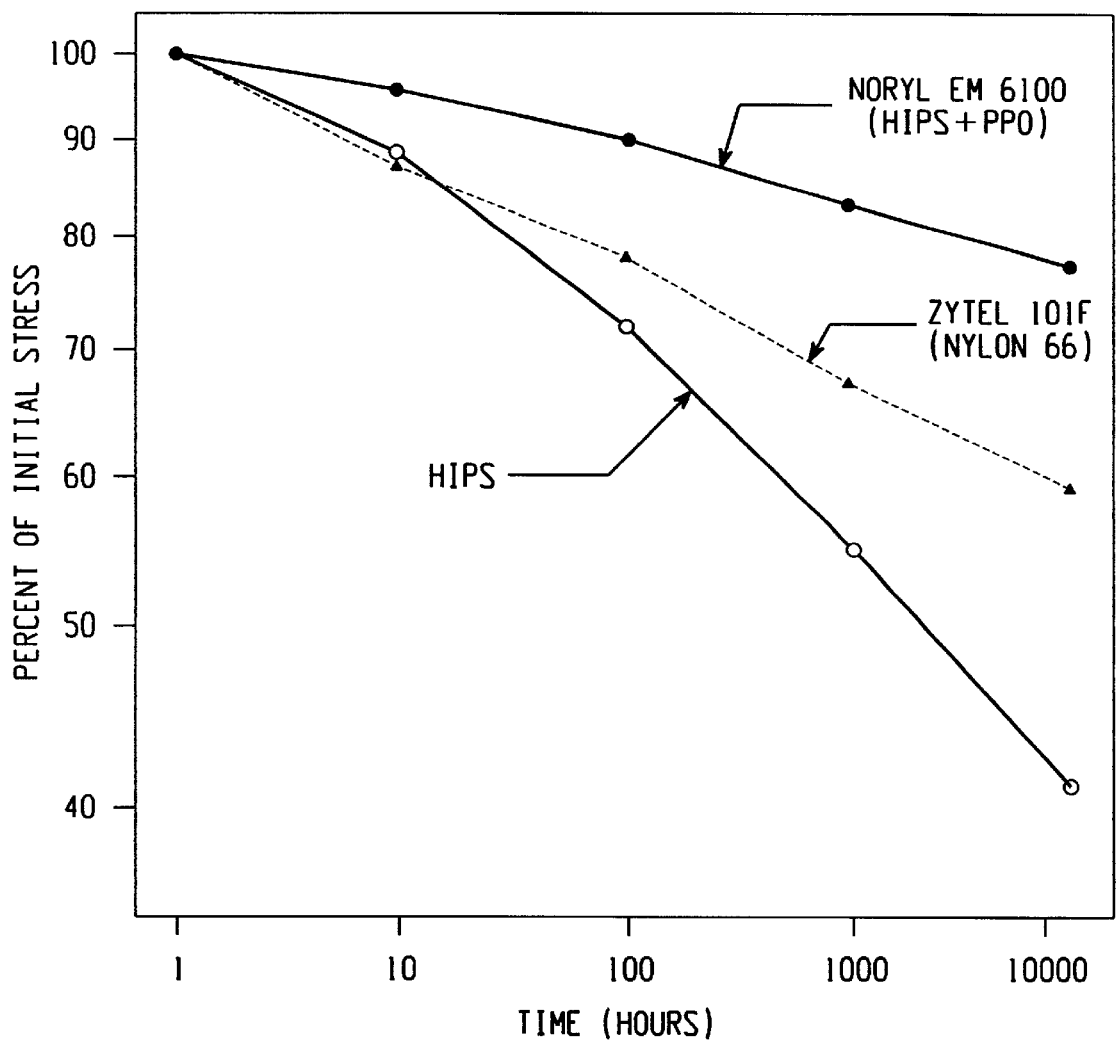
FIG. 3 is a graph of stress relaxation verses time at room temperature for NORYL® EM6100, HIPS and ZYTEL® 101F.

The increased HDT of NORYL's would suggest that the rate of stress relaxation of these materials should also be decreased, lending to improved leakage performance. FIG. 3 displays the stress relaxation of Zytel® 101F, HIPS, and NORYL® 6100. FIG. 4 graphically displays the rate of stress relaxation. These graphs show that the stress in NORYL decays out at the lowest rate. Therefore, it is expected to maintain the compressive stress in the sealing zone of an alkaline gasket the longest and hence give the best leakage resistance.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electrochemical cell comprising:
   a cell container;
   a cell cover; and
   a gasket disposed between the cell container and the cell cover and providing a seal between the cell container and the cell cover, said gasket being formed of a styrenic polymer blend including a styrenic polymer and an impact modifying agent in an amount effective to increase the toughness of the styrenic polymer, wherein the impact modifying agent is a tri-block copolymer containing a polyolefinic elastomeric block disposed between amorphous polystyrene blocks.

2. The cell of claim 1, wherein the styrenic polymer blend is comprised of from about 70% to about 95% of the styrenic polymer and from about 5% to about 30% of the impact modifying agent.

3. The cell of claim 1, wherein the styrenic polymer comprises atactic polystyrene, syndiotactic polystyrene, or both.

4. The cell of claim 1, wherein the tri-block copolymer is selected from the group consisting of styrene-butadiene-styrene, styrene-isoprene-styrene, styrene-ethylene/butylene-styrene, and styrene-ethylene/propylene-styrene.

5. An electrochemical cell, comprising:
- a cell container;
- a cell cover; and
- a gasket disposed between the cell container and cell cover and providing a seal between the cell container and cell cover, said gasket being formed of a styrenic polymer blend containing a high impact polystyrene having a polystyrene phase and discrete polybutadiene phases.

6. The cell of claim 5, wherein the styrenic polymer blend includes an anti-stress relaxation agent.

7. The cell of claim 6, wherein the anti-stress relaxation agent is poly(phenylene oxide).

8. The cell of claim 6, wherein the anti-stress relaxation agent is an inorganic filler.

9. An electrochemical cell comprising:
- a container having a base, an upright sidewall and an open-ended top, and having at least one air opening in the base;
- a cell assembly housed in the container having an air electrode in electrical contact with the container, an anode material situated above the air electrode, a separator layer between the air electrode and the anode material, and an electrolyte in ionic contact with the air electrode and the anode material;
- a cell cover in electrical contact with said anode material; and
- an electrically insulating gasket interposed and compressed between the cell container and cell cover, the gasket formed of a styrenic polymer blend including a styrenic polymer and an impact modifying agent in an amount effective to increase the toughness of the styrenic polymer, wherein the impact modifying agent is a tri-block copolymer including a polyolefinic elastomeric block interposed between amorphous polystyrene blocks.

10. The electrochemical cell of claim 9, wherein the styrenic polymer blend is comprised of from about 50 to about 95% by weight of the styrenic polymer and from about 5 to about 40% by weight of the impact modifying agent based on the total weight of the styrenic polymer and the impact modifying agent.

11. The electrochemical cell of claim 9, wherein the tri-block copolymer is selected from the group consisting of styrene-butadiene-styrene, styrene-isoprene-styrene, styrene-ethylene/butylene-styrene, and styrene-ethylene/propylene-styrene.

12. An electrochemical cell comprising:
- a container having a base, an upright sidewall and an open-ended top, and having at least one air opening in the base;
- a cell assembly housed in the container having an air electrode in electrical contact with the container, an anode material situated above the air electrode, a separator layer between the air electrode and the anode material, and an electrolyte in ionic contact with the air electrode and the anode material;
- a cell cover in electrical contact with said anode material; and an electrically insulating gasket interposed and compressed between the cell container and the cell cover, the gasket formed of a styrenic polymer blend, wherein the styrenic polymer blend is high impact polystyrene comprising a polystyrene phase and discrete polybutadiene phases.

13. The electrochemical cell of claim 12, wherein the styrenic polymer blend includes an anti-stress relaxation agent.

14. The electrochemical cell of claim 13, wherein the anti-stress relaxation agent is poly(phenylene oxide).

15. The electrochemical cell of claim 13, wherein the anti-stress relaxation agent is an inorganic filler.

* * * * *